Oct. 1, 1963
G. W. BEHNKE ET AL
3,105,815
VIBRATORY FEEDER
Filed March 27, 1961
2 Sheets-Sheet 1
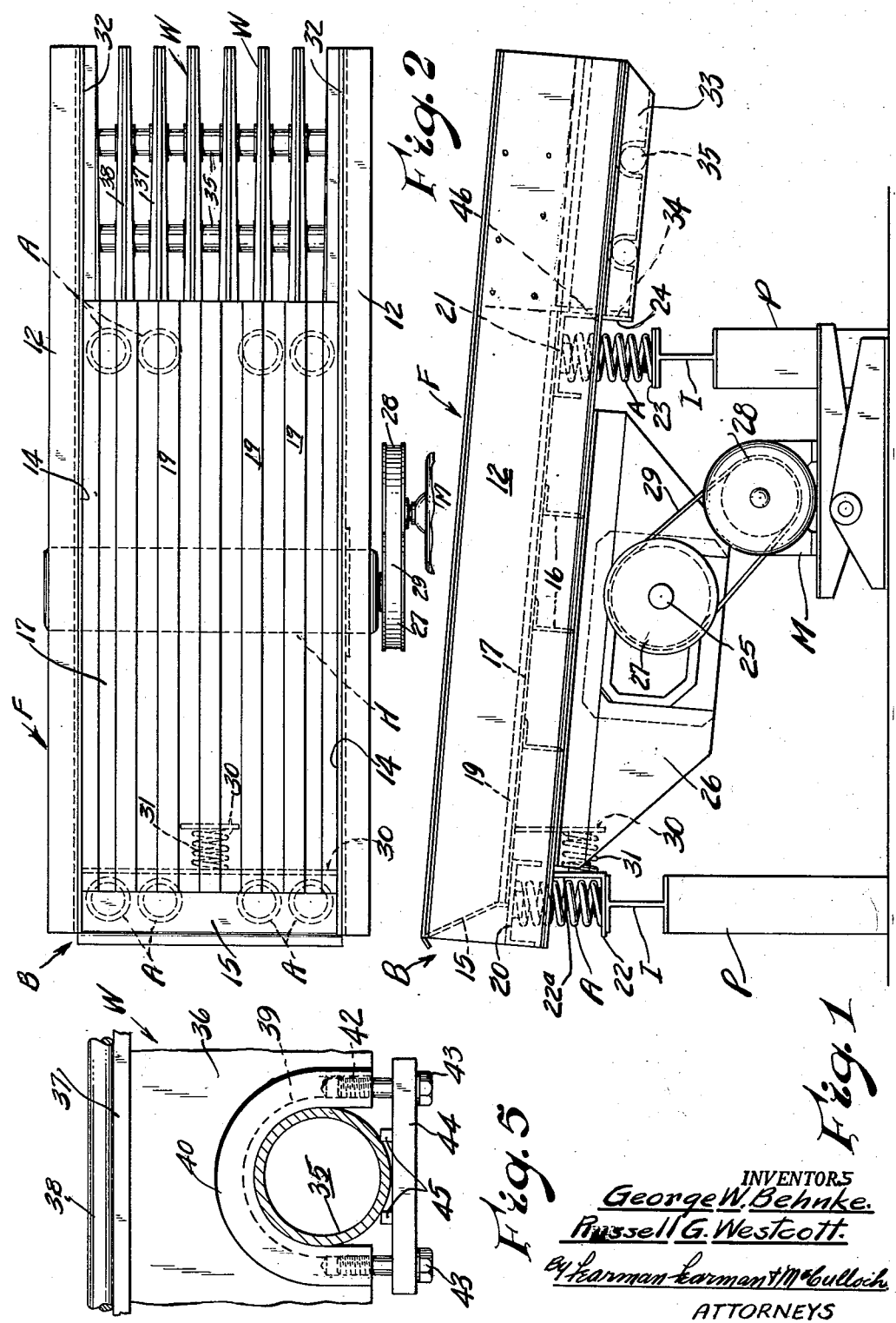
INVENTORS
George W. Behnke.
Russell G. Westcott.
by Pearman Pearman & McCulloch
ATTORNEYS

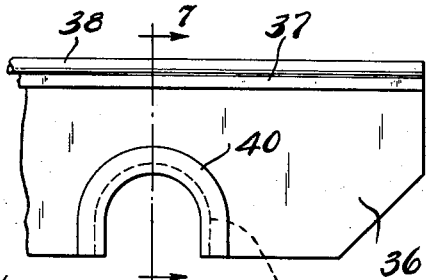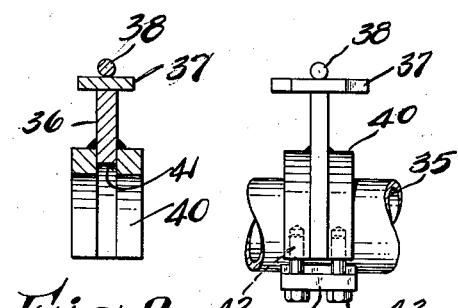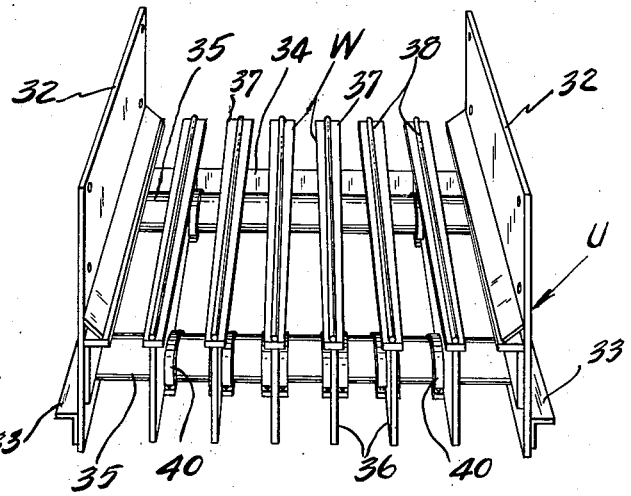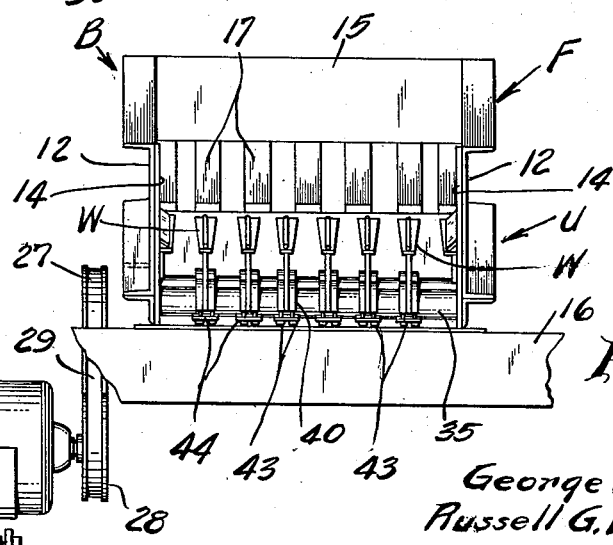

United States Patent Office 3,105,815
Patented Oct. 1, 1963

3,105,815
VIBRATORY FEEDER
George W. Behnke and Russell G. Westcott, Durand, Mich., assignors to Simplicity Engineering Company, Durand, Mich., a corporation of Michigan
Filed Mar. 27, 1961, Ser. No. 98,393
1 Claim. (Cl. 209—247)

This invention relates to vibratory feeders for handling all kinds of fragmentary materials, aggregates and the like such as produced in the sand, gravel and mining industries, and more particularly to a vibratory feeder which combines scalping and feeding in one operation to effect a size classification thereof.

In handling materials of the nature herein referred to, it is desirable to feed the material at a relatively constant rate or flow; for example, as from a hopper to a crusher or to a belt conveyor, and it is frequently necessary that the materials be separated according to size. For example, if material in a hopper is to be reduced to a predetermined size before being fed to a belt conveyor, the work done by the crusher may be reduced by separating the material which is already of desired fineness, and then feeding the crusher only the material which is larger than the desired fineness.

One of the prime objects of the invention is to design a vibrating feeder which can be installed either as a permanent or portable installation and which provides a smooth, continuous rate of feed, preventing surges of material from overloading and possible damage to the equipment.

Inasmuch as the type of material handled is usually of a highly abrasive nature, the feeder parts wear quite rapidly and replacement becomes an important matter. It is therefore one of the chief requirements that the mechanism be of rugged construction with high resistance to impact and abrasion because, in addition to the cost of replacement parts, there is the downtime required for removal and replacement. It is, therefore, a further object of the invention to design a vibrating feeder assembly equipped with a quickly removable self-cleaning grizzly section or unit facilitating quick and easy removal and replacement when the grizzly section needs to be changed, one size for another, or becomes worn, and needs replacement.

Another object of the invention is to provide a grizzly unit of unique design provided with readily removable, transversely adjustable, horizontally tapered wear bars forming gradually tapered elongated spaces therebetween to insure against lumps hanging in and clogging the grizzly section, and to further provide for smooth operation and delivery of the material being processed.

Another object of the invention is to design a quickly detachable grizzley unit or section so that when a change in material being run requires larger or smaller lumps to be fed to a crusher or the like, another stock grizzly section with wider or narrower openings can be quickly substituted or the spacing of the wear bars varied to suit the material being processed.

With the above and other objects in view, the present invention consists of the combination and arrangement of parts, hereinafter fully described, illustrated in the accompanying drawings, and more particularly pointed out in the appended claim, it being understood that changes may be made in the form, size and minor details of construction without departing from the spirit, or sacrificing any of the advantages of the invention.

In the drawings:

FIG. 1 is a side elevational view of the vibrating feeder.

FIG. 2 is a fragmentary top plan view thereof.

FIG. 3 is an end elevational view thereof with the supports omitted.

FIG. 4 is an enlarged perspective plan view of the removable grizzly unit.

FIG. 5 is an enlarged transverse sectional view illustrating the manner of clamping the bars in position.

FIG. 6 is an enlarged fragmentary end elevational view of one of the wear bars and its mounting.

FIG. 7 is an enlarged fragmentary edge elevational view of one of the wear bars.

FIG. 8 is a section taken on the line 8—8 of FIG. 7.

The instant invention is somewhat similar to the design shown in Patent No. 2,974,795, dated March 14, 1961, the letter B indicating the vibrator feeder assembly, the frame F of which incluudes a pair of side channels 12—12 having plates 14—14 secured to the inner face thereof and a cross member 15 spans the upper end of the frame. A plurality of spaced apart, transversely disposed members 16 span the side members and a metal deck or apron 17 is mounted thereon and secured to said side plates. The front end plate 15 spans the side members 14—14, being inclined as shown, and is secured in position in any desired manner.

Longitudinally disposed, transversely spaced impact bars 19 are mounted on the apron 17, and all fines which pass the space between said impact bars fall thereon and travel to the discharge end of the apron as the device is actuated.

Channel shaped members 20 and 21 span the ends of the frame beneath the apron 17, and spring assemblies A are interposed between said members and plates 22 and 23 respectively, which plates can be mounted on I beams I carried on piers or abutments P as usual, or the piers can be eliminated and the frame can be suspended from suitable supports (not shown), or it can be mounted in any other desired manner.

The long leg 24 of the channel 21 forms the end of the apron, but the side channels 12—12 project beyond the end of said apron for the purpose to be presently described.

The vibrating mechanism is mounted under frame F and includes an eccentric shaft 25 mounted in a cylindrical housing H which spans the frame, and is supported on plates 26 depending from the frame side plates 14, and a sheave 27 is provided on the end of the shaft 25 and is drivingly connected to a sheave 28 provided on the motor M by means of belt 29, and we do not deem it necessary to describe this vibrating mechanism in detail as it is substantially the same as that shown and described in Patent No. 2,311,814, issued February 23, 1943, to George W. Behnke et al.

To compensate for thrust created by the action of the feeder on the material, which causes the feeder to move backward on the springs A, away from the discharge end, we provide a transversely disposed depending plate 30 secured to the bottom of the frame F, and a spring 31 is interposed between said plate and the upturned section 22a of plate 22 which rests on the abutment.

The detachable grizzly unit U forms a continuation of the apron impact bars and is formed as clearly shown in FIGS. 3 and 4 of the drawings, it comprises a pair of side plates 32 with longitudinally disposed angles 33 secured to the lower edges of the side plates, and a transversely disposed plate 34 spans the end of the grizzly.

Transversely disposed longitudinally spaced pipe sections 35 span the lower section of the grizzly at points intermediate its length, and a plurality of transversely spaced wears bar W are detachably mounted thereon and form a continuation of the impact bars 17, each wear bar comprising a plate 36 having a longitudianlly tapered top plate 37 secured on the upper edge thereof and a cylindrical bar 38, preferably of hardened stock, is welded to the upper face of said top plate. The lower edges of the plates 36 are formed with circular cutouts 39, and one section of a clamp member 40 grooved as at 41 to accommodate the marginal edge of the cutout is welded thereto.

The lower end walls of the open end of clamps 40 are drilled and threaded as at 42 and accommodate screws 43 which extend through the bar 44 which forms the lower half of the clamp. Preferably square bosses 45 are provided on the inner face of the bar 44 for engagement with the pipe sections 35 and prevent accidental displacement or shifting of the wear bars thereon, but it will be understood that these wear bars can be readily adjusted transversely when desired, or replaced when worn or defective.

These wear bars are constructed to provide two-way relief for the material being processed, because all fines that pass between the wear bars are discharged at the discharge end of the apron, whereas the lumps pass onto the grizzly wear bars which are outwardly tapered as previously described to prevent the material hanging between the bars and clogging. The grizzly unit is open at the bottom so that all fines are removed before they reach the crusher, as the inclusion of the fines would seriously effect the efficiency of the crushing operation; if desired the fines may be diverted and directed to a belt (not shown) which belt can travel under the crusher while the lumps and oversize material discharges directly into the crusher.

The shape of the pipe 35 insures that no material will hang between the grizzly bars at this point and the manner of mounting the wear bars permits easy removal and/or adjustment while firmly retaining it in set position when secured in position.

When the grizzly unit is mounted on the frame, the ends of the plates 32 butt against the ends of the side plates 14 which, it will be noted, do not extend the full length of channels 12, and suitable openings are provided in the side plates 32 in alignment with openings in the projecting ends of the side channels 12—12 to facilitate securing the sections together. A plate 46 spans the side plates 32 and overlies the adjacent edges of the members 24 and 34; openings (not shown) are also provided in the members 34 and 24 to accommodate bolts (not shown) and provide a rigid connection of the members 24, 34 and 46, these bolts being easily removable for changing and/or replacement of the unit when desired or found necessary.

When the machine is in operation, the material is fed to the apron section of the feeder, the fines dropping down onto the deck between the impact bars 19, and travel toward the discharge end of the apron, the oversize material sliding from the impact bars 19 onto the grizzly, thence over the wear bars W to point of discharge, the tapering of the bars 38 eliminating the possibility of the material hanging therebetween or clogging the unit, and the fines cannot hang on the pipes 35.

It will of course be understood that the apron 17 can be replaced by a screen should screen sizing be desired.

From the foregoing description, it will be clearly obvious that we have perfected a very simple, practical, and economical apron feeder for handling material of all kinds, and in which the grizzly unit can be readily removed and/or replaced as required.

What we claim is:

A vibratory grizzly feeder mechanism comprising: a vibrating main frame, a feeder apron spanning said frame; transversely spaced side members on the frame and extending a predetermined distance beyond the discharge end of the apron; a detachable grizzly unit including side plates detachably secured to said frame side members; tubular members spanning said grizzly side plates; transversely spaced apart wear bars releasably and adjustably secured to said tubular members; the lower edge of each wear bar being provided with an open, bearing shaped cutout; open clamp members welded to the opposite sides of each wear bar and encircling said cutout; said members being shaped to releasably accommodate the tubular cross member transversely disposed; flat, lower clamp bars spanning the open ends of the clamp members and rigidly secured thereto for clamping the wear bars to the tubular members, and raised bosses provided on the upper face of each clamp bar on which said tubular members are carried to provide non-slip clamping engagement therewith.

References Cited in the file of this patent
UNITED STATES PATENTS

| | | |
|---|---|---|
| 907,539 | Thomas | Dec. 22, 1908 |
| 1,187,238 | Beaumont | June 13, 1916 |
| 1,212,708 | Steinberger | Jan. 16, 1917 |
| 1,216,798 | Green | Feb. 20, 1917 |
| 1,315,693 | Wiseman | Sept. 9, 1919 |
| 1,974,092 | Alsaker | Sept. 18, 1934 |
| 1,985,951 | Richterkessing | Jan. 1, 1935 |
| 2,321,166 | Symons | June 8, 1943 |
| 2,689,102 | Wholen | Sept. 14, 1954 |
| 2,914,177 | Parks | Nov. 20, 1959 |
| 2,974,795 | Behnke | Mar. 18, 1961 |